(12) United States Patent
Hurst et al.

(10) Patent No.: US 8,005,069 B2
(45) Date of Patent: *Aug. 23, 2011

(54) METHODS AND APPARATUS TO SELF-CONFIGURE A FLEXIBLE RESIDENTIAL GATEWAY

(75) Inventors: William Robert Hurst, San Antonio, TX (US); Jeffrey Multach, San Antonio, TX (US); Steven Michael Wollmershauser, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1719 days.

This patent is subject to a terminal disclaimer.

(21) Appl. No.: 11/112,617

(22) Filed: Apr. 22, 2005

(65) Prior Publication Data

US 2006/0239244 A1 Oct. 26, 2006

(51) Int. Cl.
*H04L 12/66* (2006.01)
(52) U.S. Cl. .................. 370/352; 370/401; 379/399.01; 709/249
(58) Field of Classification Search .......... 370/351–356; 379/399.01–413.04
See application file for complete search history.

(56) References Cited

U.S. PATENT DOCUMENTS

| | | | |
|---|---|---|---|
| 5,623,543 A | 4/1997 | Cook | |
| 5,905,781 A | 5/1999 | McHale et al. | |
| 5,930,340 A | 7/1999 | Bell | |
| 6,005,873 A | 12/1999 | Amit | |
| 6,144,659 A | 11/2000 | Nye et al. | |
| 6,160,843 A | 12/2000 | McHale et al. | |
| 6,317,884 B1 | 11/2001 | Eames et al. | |
| 6,452,923 B1 | 9/2002 | Gerszberg et al. | |
| 6,526,581 B1 | 2/2003 | Edson | |
| 6,546,016 B1 | 4/2003 | Gerszberg et al. | |
| 6,714,534 B1 | 3/2004 | Gerszberg et al. | |
| 6,963,559 B2 | 11/2005 | Elo | |
| 7,103,760 B1 * | 9/2006 | Billington et al. | 713/1 |
| 7,154,996 B2 | 12/2006 | Strauss | |
| 7,382,786 B2 | 6/2008 | Chen et al. | |
| 2001/0030950 A1 | 10/2001 | Chen et al. | |
| 2002/0021465 A1 | 2/2002 | Moore, Jr. et al. | |
| 2002/0091861 A1 | 7/2002 | Kim et al. | |
| 2002/0097739 A1 | 7/2002 | Chen et al. | |
| 2002/0196774 A1 * | 12/2002 | Wissing et al. | 370/352 |

(Continued)

OTHER PUBLICATIONS

Gaw, David; What is a Residential Gateway and Can it Deliver; Home Hotys; EMagazine vol. 5 Issue 4; year 2000, pp. 1-3.

(Continued)

*Primary Examiner* — Fan Tsang
*Assistant Examiner* — Ibraham Sharifzada
(74) *Attorney, Agent, or Firm* — Hanley, Flight & Zimmerman, LLC (57) ABSTRACT

Methods and apparatus are disclosed to self-configure a flexible residential gateway providing access to an external communications network, and providing communications with an in home network. An example flexible residential gateway may include at least one voice over Internet protocol (IP) (VoIP) processor, at least one VoIP coupler connecting VoIP signals between at least one VoIP processor and at least one telephone line. In such an arrangement, the VoIP coupler may be configurably capable to disconnect a battery feed voltage and ring voltages from a telephone line. The gateway may further include a switch controller capable of disconnecting the battery feed voltage and the ring voltages from at least one telephone line if POTS signals are detected on at least one telephone line.

23 Claims, 10 Drawing Sheets

U.S. PATENT DOCUMENTS

| | | | |
|---|---|---|---|
| 2003/0035471 | A1 | 2/2003 | Pitsoulakis |
| 2003/0035523 | A1 | 2/2003 | Mansfield |
| 2003/0126295 | A1 | 7/2003 | Doherty |
| 2003/0169752 | A1 | 9/2003 | Chen et al. |
| 2003/0210779 | A1* | 11/2003 | Bremer et al. ........... 379/399.01 |
| 2004/0090971 | A1 | 5/2004 | Anderson, IV |
| 2004/0107299 | A1* | 6/2004 | Lee et al. ...................... 709/249 |
| 2004/0172658 | A1 | 9/2004 | Rakib et al. |
| 2004/0204040 | A1 | 10/2004 | Heijnen |
| 2006/0209857 | A1 | 9/2006 | Hicks, III |
| 2006/0239278 | A1 | 10/2006 | Hurst et al. |
| 2006/0239425 | A1 | 10/2006 | Hurst et al. |

OTHER PUBLICATIONS

Frank et al.; Connecting the home with a phone line network chip set; year 2000; IEEE; pp. 27-38.

Office Communication for U.S. Appl. No. 11/112,093, mailed Nov. 4, 2008, 9 pages.

Office Communication for U.S. Appl. No. 11/112,093, mailed Apr. 16, 2008, 12 pages.

Office Communication for U.S. Appl. No. 11/112,082, mailed Oct. 27, 2008, 9 pages.

Office Communication for U.S. Appl. No. 11/112,082, mailed Jun. 13, 2008, 9 pages.

Notice of Allowance and Fee(s) Due for U.S. Appl. No. 11/112,082, mailed Feb. 6, 2009, 7 pages.

United States Patent and Trademark Office, Office Action issued for U.S. Appl. No. 11/112,093, mailed on Jun. 2, 2009, 10 pages.

United States Patent and Trademark Office, Notice of Allowance issued for U.S. Appl. No. 11//112,082, mailed on Jul. 10, 2009, 8 pages.

USPTO, "Office Action," issued in connection with U.S. Appl. No. 11/112,093, mailed on Mar. 5, 2010 (23 pages).

USPTO, "Notice of Allowance," issued in connection with U.S. Appl. No. 11/112,093, mailed on Sep. 29, 2010 (12 pages).

* cited by examiner

|  | WAN ETHER | ADSL | VDSL | VDSL OVER COAX | MOCA | HOMEPNA VER2 | HOMEPNA VER3 | SEALING | POTS |
|---|---|---|---|---|---|---|---|---|---|
| ADSL | NA | | | | | | | | |
| VDSL | NA | NA | | | | | | | |
| VDSL OVER COAX | NA | NA | NA | | | | | | |
| MOCA | NA | OK | OK | OK | | | | | |
| HOMEPNA VER2 | OK | OK | BAD | NA | | | | | |
| HOMEPNA VER3 | OK | OK | OK | NA | NA | | | | |
| POTS | OK | OK | OK | NA | OK | OK | OK | | |
| VOIP | OK | OK | OK | NA | OK | OK | BAD | BAD | |

METHODS AND APPARATUS TO SELF-CONFIGURE A FLEXIBLE RESIDENTIAL GATEWAY

FIELD OF THE DISCLOSURE

This disclosure relates generally to flexible residential gateways, and, more particularly, to methods and apparatus to self-configure a flexible residential gateway to substantially reduce interference between voice over Internet protocol (IP) (VoIP) signals and plain old telephone service (POTS) signals.

BACKGROUND

Not long ago, the only communication service in a residence was plain old telephone service (POTS). A residence typically had a single telephone connected within the residence via a single piece of twisted pair telephone line to a network interface demarcation (NID) point outside the residence. With such a configuration there were essentially no opportunities for interfering signals and/or incorrect cross connection of telephone lines. As time progressed, more phones were added to residences using a variety of wiring topologies, e.g., star, home run, daisy chain, etc. The combinations present in residences today are nearly endless, and many homeowners are not fully aware of how the telephone wiring in their home is connected. As time further progressed, advanced homeowners began installing and configuring computer networks to allow multiple computers inside their residence to share files, printers, etc. These home networks were typically installed by knowledgeable, advanced users or paid installers, and utilized a set of wiring parallel to the telephone wiring so that the chances of improper cross connection with existing telephone lines remained minimal.

Figure 1:
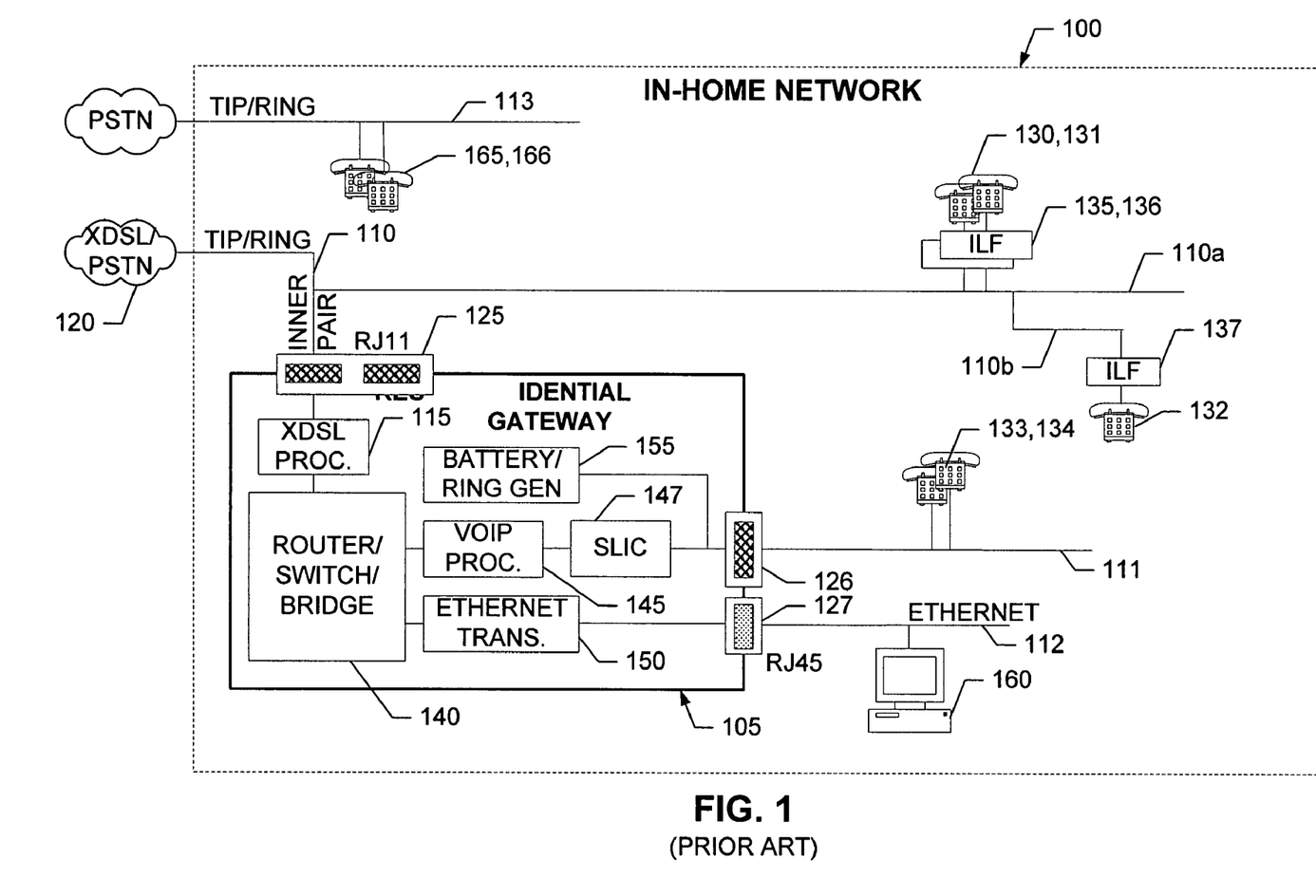
FIG. 1 is a diagram of an example prior art in home network including a residential gateway communicating with an external network using xDSL signals.

In recent years, there has been a proliferation of interconnected devices and communication networks within residences—many installed by homeowners with minimal knowledge of the workings of such devices and the communications networks and protocols they utilize. Many homeowners now have access to the public Internet via full-time dedicated broadband connections. For example, FIG. 1 shows a prior art in home network (IHN) 100 including a residential gateway (RG) 105 for receiving and transmitting xDSL ("x" variety of Digital Subscriber Line (DSL)) signals carried across a telephone line 110 that simultaneously carries their POTS. The various xDSL standards define a family of broadband communication technologies carried across a standard telephone line between a telephone operator's central office and a residence or business. Some forms of xDSL, e.g., Asymmetric DSL (ADSL), support simultaneous POTS on the same telephone line. To process the XDSL signals, the RG 105 includes an xDSL processor 115 capable of receiving and transmitting xDSL signals from and to an external network 120 over the telephone line 110. The external network 120 provides access to the public Internet via xDSL, and access to the public switched telephone network (PSTN) via POTS or Voice over Internet Protocol (VoIP) carried in Internet protocol (IP) packets over the xDSL connection.

The xDSL processor 115 is typically connected to the telephone line 110 via the inner pair of wires of a first RJ11 connector 125. As illustrated in FIG. 1, the first RJ11 connector (like all RJ11 connectors) supports the connection of two pairs of wires (i.e., two telephone lines)—an inner pair and an outer pair, shown next to each other in the figure. In subsequent figures, if only one pair of wires is connected to an RJ11 connector only half of the corresponding RJ11 symbol is shown, for example a second RJ11 connector 126. The telephone line 110 simultaneously carries POTS and is further connected via additional telephone lines 110*a-b* to a plurality of telephones 130, 131, 132 using any number of wiring topologies, e.g., star, home-run, daisy chain, etc. To keep transients associated with POTS (e.g., ring voltages, ring trip transients, etc.) and XDSL from interfering, the IHN 100 further includes a plurality of in-line filters (ILF) 135, 136, 137. The ILF 135, 136, 137 provide a low-pass filter (LPF) response between the telephone lines 110*a-b* and the telephones 130, 131, 132 to keep POTS transients from causing interference with higher frequency xDSL signals, and vice versa. The xDSL processor 115 typically includes a high-pass filter (not shown) to further limit interference between POTS transients and xDSL signals. Example implementations of the XDSL processor 115 and the ILF 135, 136, 137 are well known to persons of ordinary skill in the art and, in the interest of brevity, will not be discussed further.

The RG 105 includes a router/switch/bridge 140 to connect user data transported using IP packets by the xDSL signals with a VoIP processor 145 or an Ethernet transceiver 150. The VoIP processor 145 is capable of communicating voice band data (VBD) signals with a second plurality of telephones 133, 134 via an additional telephone line 111. The VoIP processor 145 comprises an analog terminal adapter (ATA) and a pulse coded modulation (PCM) coder-decoder (codec). The ATA transforms digital VBD samples received in IP packets from the external network 120 into PCM encoded digital samples. The PCM encoded samples are converted to analog signals by the PCM codec. Likewise, the PCM codec converts analog signals into PCM encoded digital samples, and the ATA transforms the digital samples into IP packets for transport across the telephone line using xDSL signals to the external network 120. The analog signals to and from the PCM codec are connected to a subscriber line interface circuit (SLIC) 147. The SLIC 147 implements, among other things, a 4-wire to 2-wire hybrid function between the two analog signals (transmit and receive) associated with the PCM codec (i.e., a 4-wire signal) and a 2-wire signal (bi-directional) required for the telephone line 111. The SLIC 147 is connected to the second telephone line 111 via either the inner or outer pair of the second RJ11 connector 126. Alternatively, the SLIC 147 may be connected to the outer pair of the RJ11 connector 125. To provide battery feed voltage and to allow the VoIP processor 145 to ring one or more of the telephones 133, 134, the RG 105 includes a battery/ring generator 155. The battery/ring generator 155 supplies a −48 volts (V) direct current (DC) battery feed voltage for use by the telephones 133, 134 and also supplies alternating current (AC) ring voltages that may be superimposed on top of the battery feed voltage to ring the telephones 133, 134.

The Ethernet transceiver 150 is capable of communicating Ethernet signals (e.g., IEEE 802.3, IEEE 802.3u, IEEE 802.3z, IEEE 802.3ae, etc.) with one or more computers 160 via a computer cable 112 (e.g., unshielded twisted pair (UTP) Category 5 (Cat5) cabling). The Ethernet transceiver 150 is connected to the computer cable 112 via an RJ45 connector 127. The example IHN 100 further includes another telephone line 113 providing POTS to a third plurality of telephones 165, 166.

Example implementations of the router/switch/bridge 140, the VoIP processor 145 (including ATA and PCM codec), the SLIC 147, the Ethernet transceiver 150, the computer line 112, the battery/ring generator 155, and the computer 160 are well known to persons of ordinary skill in the art and, thus, will not be discussed further.

Figure 2:
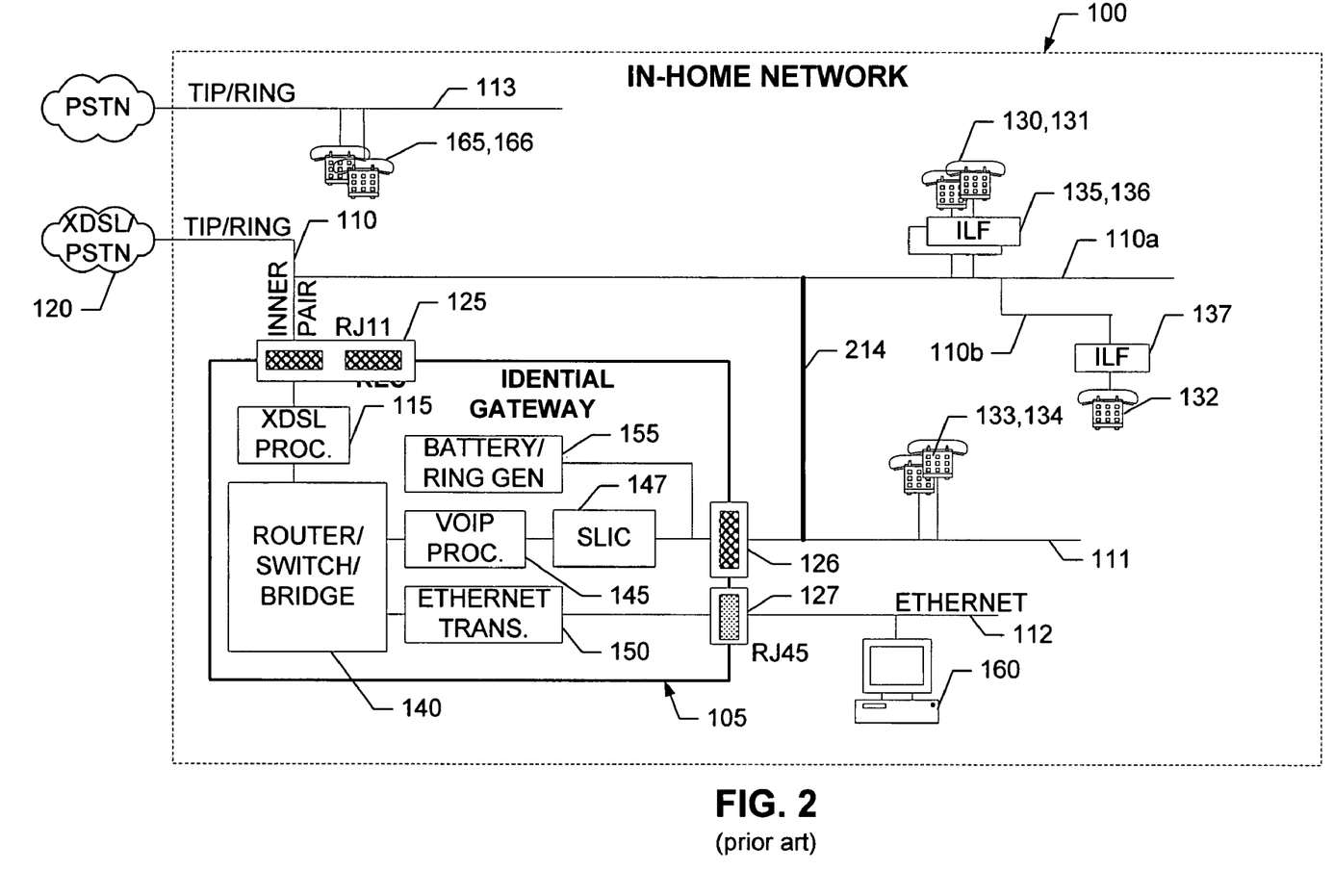
FIG. 2 shows the in home network of FIG. 1 in which a misconnection of wiring has occurred.

FIG. 2 shows the example IHN 100 of FIG. 1 in which the user has incorrectly or inadvertently connected the telephone line 111 to the telephone line 110a via a telephone line 214. The telephone line 214 creates a condition in which both the RG 105 and the external network 120 (i.e., the PSTN 120) are providing battery feed voltage to the telephone lines 110, 110a-b, 111, 214. Depending upon relative polarities of batteries of the RG 105 and the PSTN 120, the telephone lines 110, 110a-b, 111, 214 may experience a net battery feed voltage of −96V or 0V. The former represents a dangerous condition due to excess voltage present on the telephone lines 110, 110a-b, 111, 214. The latter represents a condition in which no battery feed voltage is present and, thus, one or more of the telephones 130-134 may not operate correctly. The incorrect/inadvertent connection 214 may further create interference between a sealing current provided by the PSTN 120 and the battery feed voltage provided by the RG 105.

Figure 3:
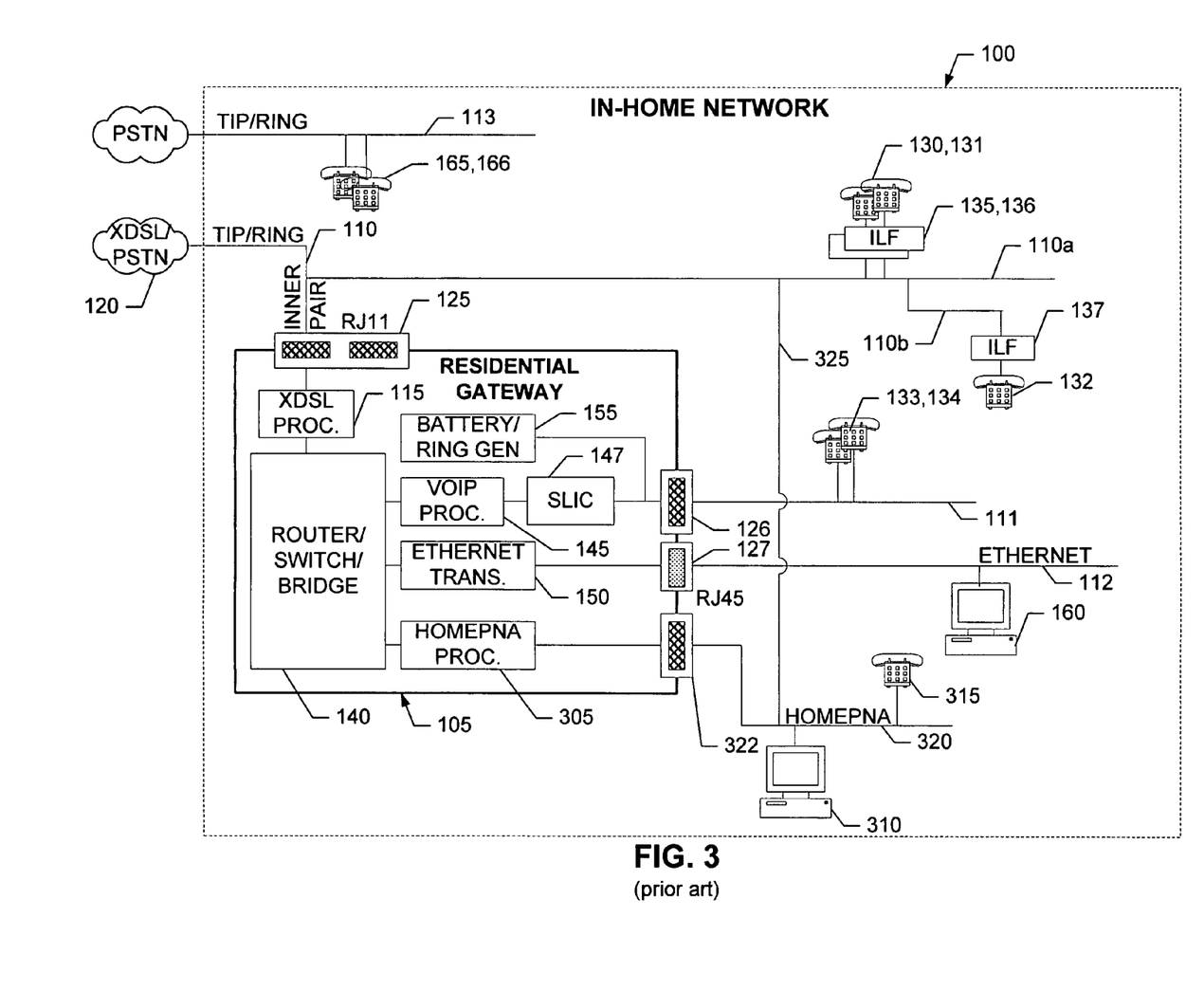
FIG. 3 is the in home network of FIG. 1 further including HomePNA.

FIG. 3 shows the example IHN 100 of FIG. 1 further supporting Home PhoneLine Networking Alliance (HomePNA) communications within the IHN 100. HomePNA is a high-speed, reliable local area network (LAN) technology that uses the existing telephone wires in a residence, and allows several computers to share a single Internet connection. To support HomePNA communications, the RG 105 further includes a HomePNA processor 305 to communicate HomePNA signals with, for example, a computer 310 and a HomePNA enabled phone 315. The HomePNA signals are carried across a telephone line 320, that the HomePNA processor 305 is connected to via either an inner or an outer pair of wires of an RJ11 connector 322. Example implementations of the HomePNA processor 305 are well known to persons of ordinary skill in the art, and will not be discussed further.

In the example of FIG. 3, the telephone line 320 is connected to the telephone line 110a via a telephone line 325. The telephone line 325 may have been connected purposefully by a user so that HomePNA devices attached to the telephone line 110a-b can communicate with the HomePNA processor 305, or so that ordinary telephones attached to the telephone line 320 can communicate with the PSTN 120. The connection 325 may also have been made unintentionally by the user. However, because HomePNA signals and VDSL signals may spectrally overlap (depending upon the version of the HomePNA standard being implemented by the HomePNA processor 305), the connection 325 may cause HomePNA signals to interfere with any VDSL signals present on the first telephone line 110. Such interference may cause one or both of the xDSL processor 115 or the HomePNA processor 305 to be unable to communicate properly with attached devices.

Figure 4:
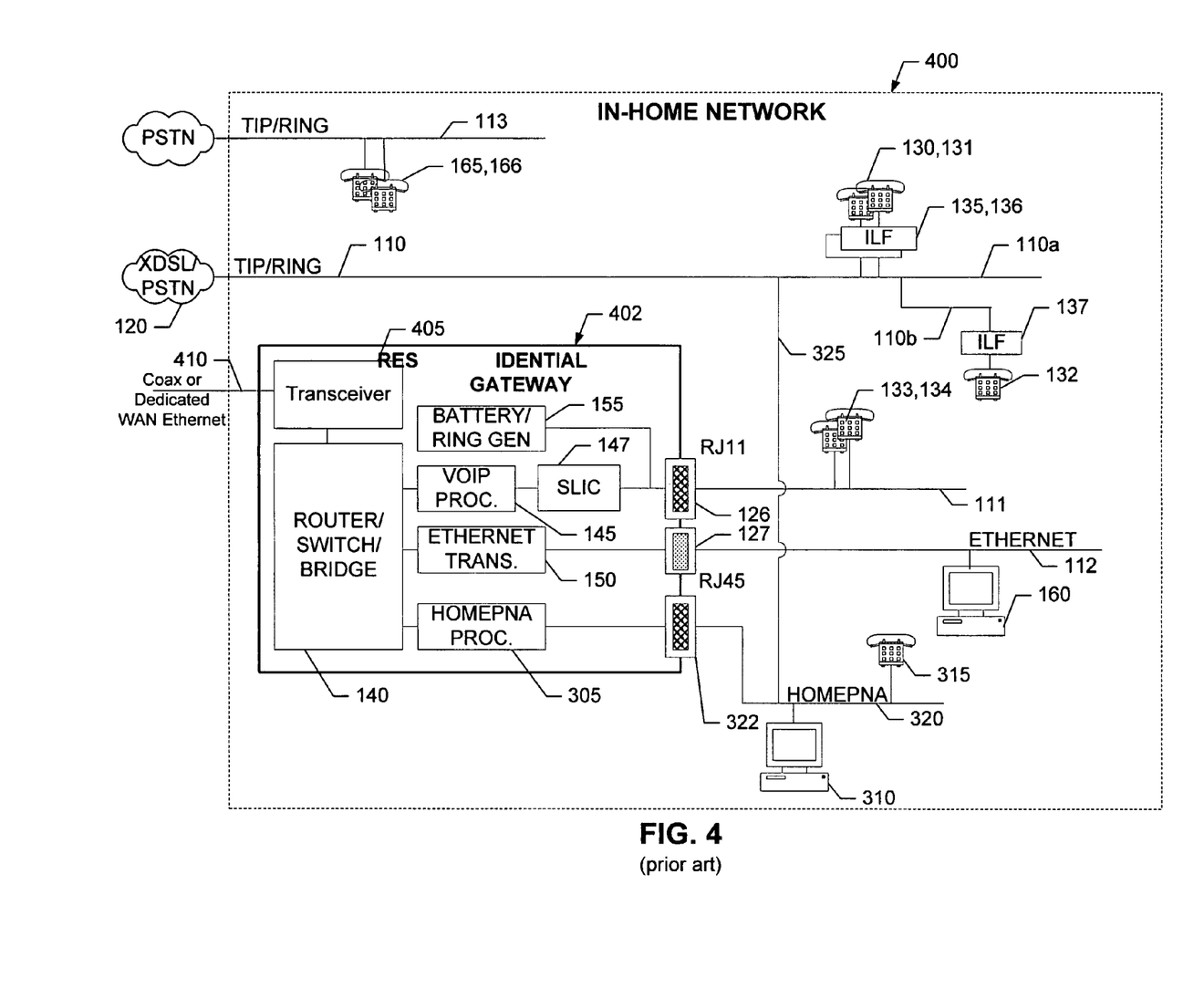
FIG. 4 is a diagram of an example prior art in home network including a residential gateway communicating with an external network using signals carried across coaxial cable or using Ethernet signals.

FIG. 4 shows an example prior art IHN 400 including a residential gateway (RG) 402 for receiving and transmitting signals carried across a cable 410 from an external network (not shown). To communicate with the external network, the RG 105 includes a transceiver 405 to transmit and receive signals received over the cable 410 (e.g., coaxial cable or UTP Cat5 cable). The signals may be Ethernet signals (e.g., IEEE 802.3, IEEE 802.3u, IEEE 802.3z, IEEE 802.3ae, etc.), xDSL signals over coaxial cable, or multimedia over cable association (MOCA) signals. In the example of FIG. 4, because there are no xDSL signals present on the telephone line 110, there is no need for in line filters, and there is no potential interference between HomePNA signals and VDSL signals. Example implementations of the transceiver 405 for Ethernet, xDSL over coaxial cable, and/or MOCA are well known to persons of ordinary skill in the art, and, thus, will not be discussed further.

Figure 5:
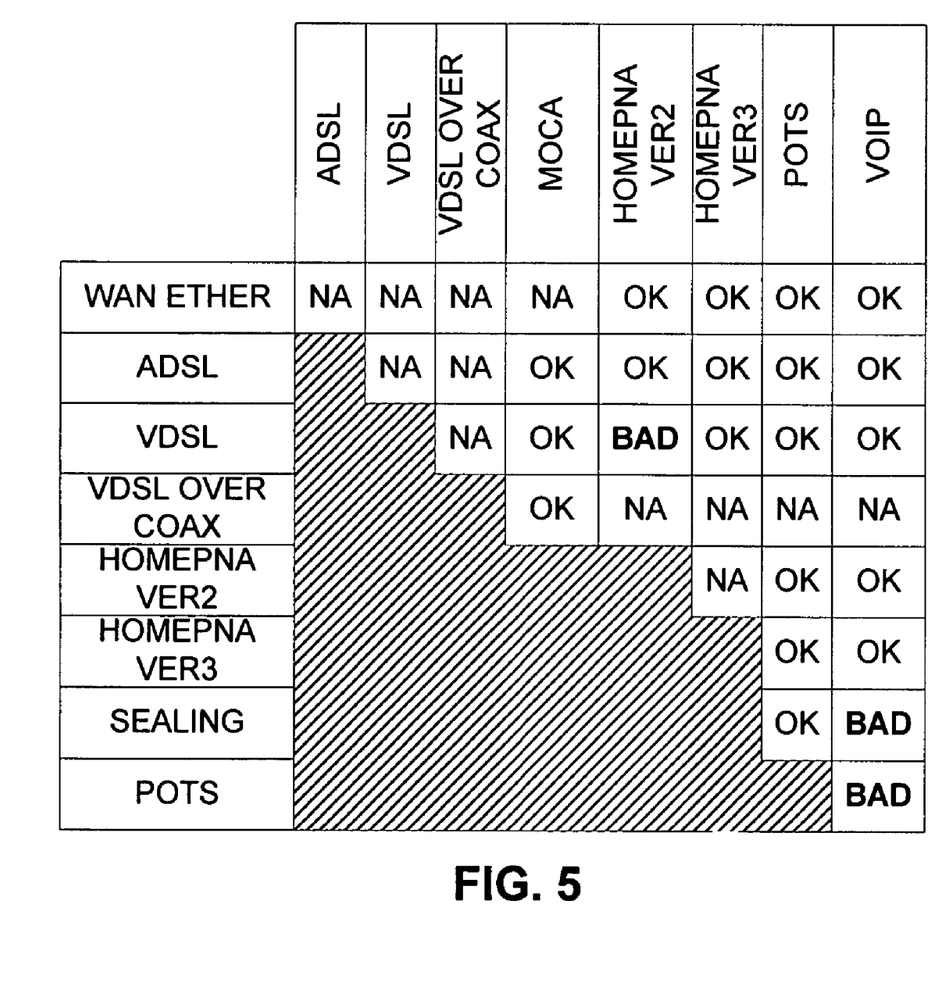
FIG. 5 is a table illustrating which communication signals can coexist without interference on the same cable.

FIG. 5 shows a table illustrating the combinations of signals in the example in home networks of FIGS. 1-4 may cause interference when the signals are on the same wire/cable/telephone line. Each entry in the table contains a value of NA, OK, or BAD. An entry of NA (i.e., not applicable) is used if there is no possibility of interference because the two signals are carried on two types of wire/cable/telephone line that can not be physically connected to each other (using the standard and appropriate connectors designed for each wire/cable/telephone line). For example, WAN Ethernet is carried over UTP Cat5 cable with an RJ45 connector and xDSL over coaxial cable is carried over coaxial cable with an F-connector. In FIG. 5, an entry of NA is also used when the two signals types could not possibly be present at the same time, for example, a residence would not simultaneously be subscribing to ADSL and VDSL service over the same telephone line. An entry of OK is used if the signals are carried over the same type of wire/cable/telephone line, but the two signals would not interfere (e.g., they do not spectrally overlap), for example, ADSL uses frequencies above 35 kiloHertz (kHz) and POTS uses frequencies below 4 kHz, and, therefore, these two signals can coexist on the same telephone line without fear of interference. Finally, an entry of BAD in FIG. 5 indicates signals that would interfere. For example, VDSL uses frequencies between 100 kHz and 12 MegaHertz (MHz) and HomePNA version 2 uses frequencies between 4 MHz and 10 MHz. A new HomePNA standard (i.e., version 3) was developed with spectral masks to limit interference between VDSL and HomePNA version 3 signals.

As will be readily appreciated by those having ordinary skill in the art, it is desirable to provide as much functionality as possible while minimizing or eliminating the possibility of interference.

DETAILED DESCRIPTION

Figure 6:
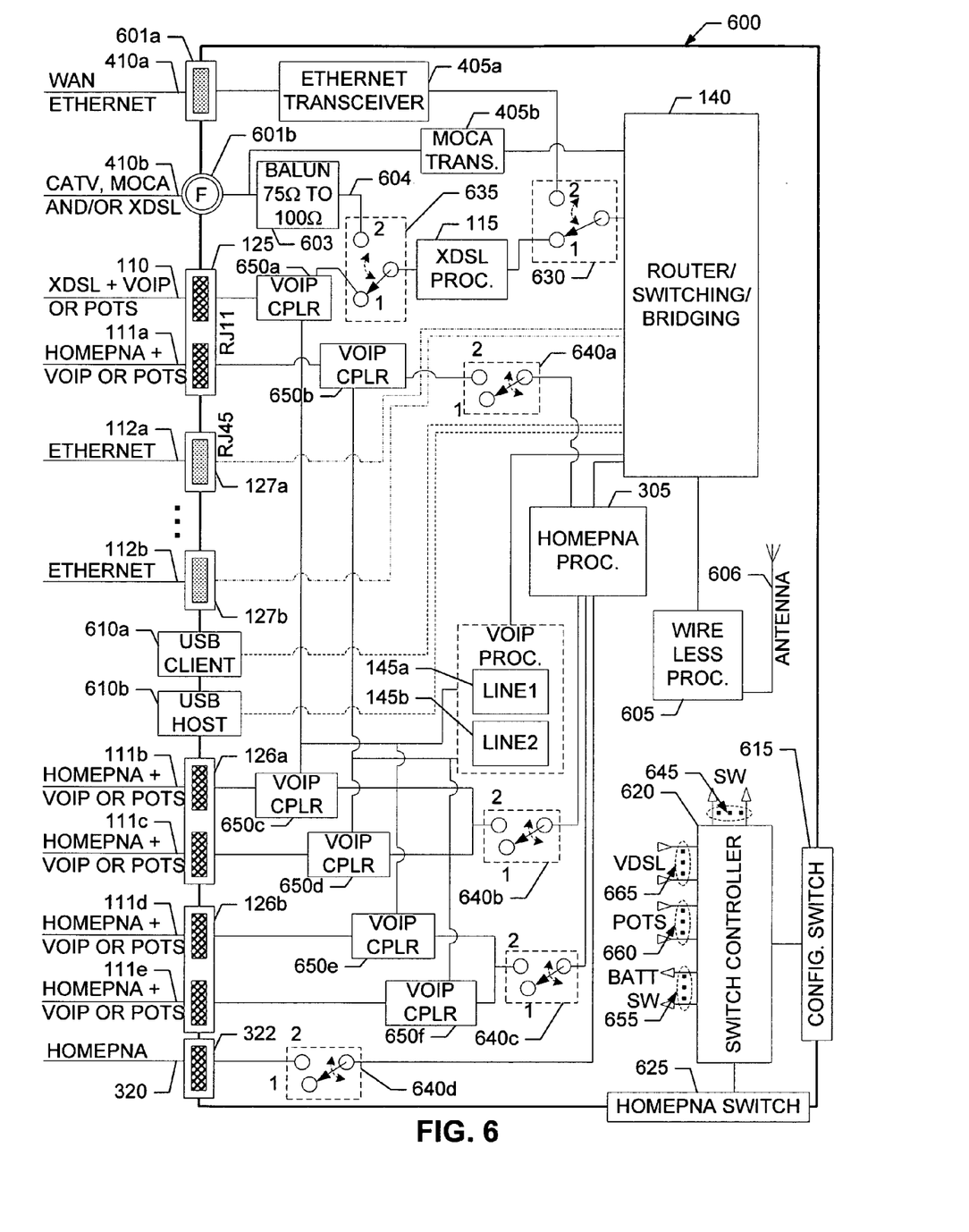
FIG. 6 is a block diagram illustration of a disclosed example flexible residential gateway.

FIG. 6 shows a block diagram illustration of a disclosed example flexible residential gateway (FRG) 600 that could be substituted for the RG 105 or the RG 402 in the example in home networks of FIGS. 1-4. The example FRG 600 supports a plurality of broadband wide area network (WAN) services in a single unit, for example: dedicated Ethernet via an Ethernet transceiver 405a, a connector 601a, and a UTP Cat5 cable 410a; MOCA via a MOCA transceiver 405b, a "F" connector 601b, and a coaxial cable 410b; xDSL via the xDSL processor 115, the RJ11 connector 125, and the telephone line 110; etc. The FRG 600, as described below, operates to minimize connection errors between components. Including a plurality of broadband WAN services in a single device provides a number of advantages, e.g., it reduces the number of residential gateway devices that vendors, manufacturers, fulfillment vendors, and service providers require to deliver broadband WAN services and products to customers. It also allows customers to use the same FRG 600 even if they change broadband WAN services or providers.

The FRG 600 provides a balanced-unbalanced (BALUN) adapter 603 between the "F" connector 601b and the xDSL processor 115 to transform a balanced xDSL signal present on the 75 ohm coaxial cable 410b to a 100 ohm unbalanced signal 604 suitable for the xDSL processor 115. This configuration allows the FRG 600 to implement xDSL over coaxial cable 410b in the same unit that implements xDSL over the telephone line 110.

The example FRG 600 further supports a plurality of IHN services in a single unit, for example: VoIP services via a plurality of VoIP processors 145a-b, a plurality of RJ11 connectors 125, 126a-b, and a plurality of telephone lines 110, 111a-e; local area network (LAN) communications via the Ethernet transceiver 150 (not shown), a plurality of RJ45 connectors 127a-b, and a plurality of cables 112a-b; HomePNA communications via the HomePNA processor 305, a plurality of connectors 125, 126a-b, 322, and a plurality of telephone lines 110a-e, 320; wireless communications (e.g., IEEE 802.11a, IEEE 802.11b, IEEE 802.11g, Bluetooth, etc.) via a wireless processor 605 and a wireless antenna 606; universal serial bus (USB) communications via a USB processor (not shown), and a plurality of USB connectors 610a-b. Supporting such a large number of IHN communications, services and connections in a single device maximizes the distribution of IP packets across as many technologies within the home as possible. However, as discussed earlier, providing such a vast array of IHN services, connections, communication signals and communication networks in a single device increases the potential for the homeowner to incorrectly or inadvertently cross-connect telephone lines creating signal conditions that are either hazardous or cause communication services to cease working properly. To substantially minimize hazardous conditions or interfering signals, the illustrated FRG 600 provides self-configuration capabilities that are discussed in detail below.

For clarity, FIG. 6 does not illustrate a multitude of less significant data and control signals between various portions of the example FRG 600 of FIG. 6. Only illustrated in FIG. 6 are the significant data signals and connections. The requirements, connections, implementations and usages of such control and less significant data signals are well known by those of ordinary skill in the art, and, in the interest of brevity, are not discussed further.

The plurality of VoIP processors 145a-b supports a plurality of VoIP services (e.g., line 1, line 2, etc.). In the illustrated example, there are two VoIP processors, wherein line 1 is connected to the inner pair of wires (i.e., a first telephone line) associated with each of the RJ11 connectors 125, 126a-b; and line 2 is connected to the outer pair of wires (i.e., a second telephone line) associated with each of the RJ11 connectors 125, 126a-b.

It should be readily appreciated by those of ordinary skill in the art that the number of VoIP processors 145a-b, and the combinations of connections of the VoIP processors 145a-b to inner and/or outer pairs of wires associated with one or more RJ11 connectors may differ from that shown in FIG. 6. The example diagram of FIG. 6 is only illustrative of one possible combination. Alternative combinations (including fewer or additional capabilities) could be readily chosen based upon desired functionality of the FRG 600, market requirements, customer requirements, etc.

It should be further readily appreciated by those or ordinary skill in the art that the illustrated FRG 600 may be expanded via one or more of the RJ45 connectors 112a-b. An expansion device could contain, among other things, one or more additional VoIP processors, a HomePNA processor, VoIP couplers, and RJ11 connectors connected in a fashion similar to that illustrated in FIG. 6.

As described above, supporting a multitude of broadband WAN services and IHN services and connection options in a single device creates multiple and new opportunities for the user to inappropriately misconnect telephone lines 110a-e, 320 thereby causing one or more broadband WAN services or IHN services to cease operating properly. The disclosed example of FIG. 6 maximizes the flexibility of the FRG 600 (e.g., distribute IP packets and services on as many IHN services and connections as possible) while substantially minimizing the interference between signals and substantially eliminating hazardous voltage conditions. To this end, the FRG 600 includes a configuration switch 615, a switch controller 620, a HomePNA switch 625, and a plurality of switches 630, 635, 640a-d. The switches 630, 635, 640a-d are controlled by a plurality of switch control signals 645, wherein one of the switch control signals 645 is associated with each of the switches 630, 635, 640a-d. The connections of the switch control signals 645 to each of the switches 630, 635, 640a-d are not shown in FIG. 6, but persons of ordinary skill in the art will readily understand how these connections are implemented, and how the switch control signals 645 may be used to control the switches 630, 635, 640a-d.

Figure 7:
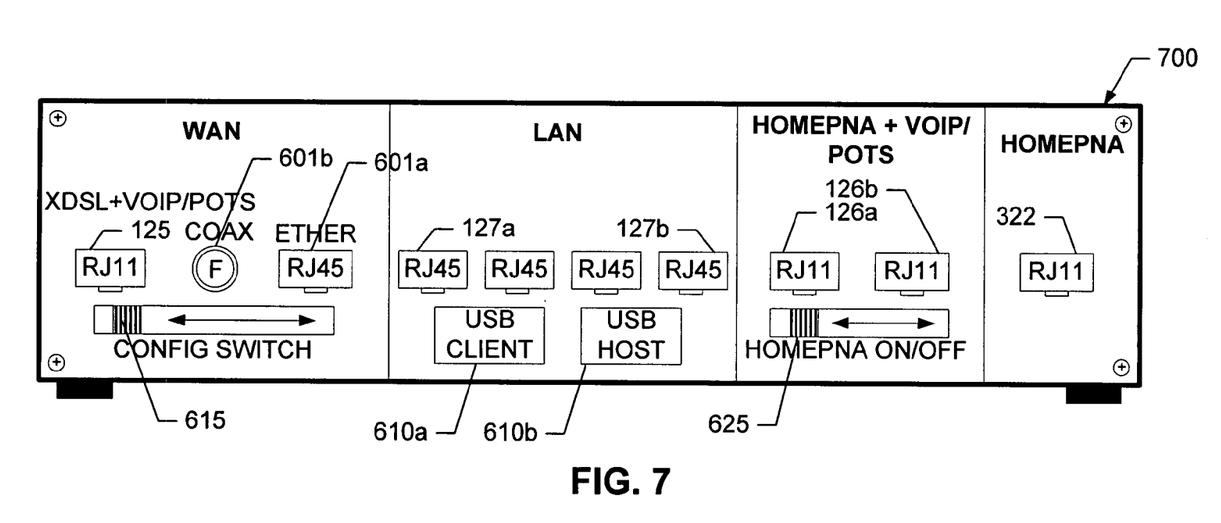
FIG. 7 is an example illustration of one side of the example flexible residential gateway of FIG. 6.

In one example, the configuration switch 615 is a three (3) position switch that allows the user to select which of the broadband WAN services are enabled and operating in the FRG 600. FIG. 7 illustrates an example side 700 (not shown to scale) of the FRG 600. As shown in FIG. 7, the configuration switch 615 can be selectively positioned beneath one of the broadband WAN service connectors, thereby selecting which broadband WAN services is to be active and operating in the FRG 600. The HomePNA switch 625 is a two (2) position switch that allows the user to enable or disable HomePNA signals for the FRG 600. As will be discussed below in conjunction with FIG. 10, even if the user selects (using the HomePNA switch 625) that HomePNA signals are enabled, the switch controller 625 may disable HomePNA signals on one or more of the telephone lines 111a-e to avoid interference with VDSL signals that may be present on one or more the telephone lines 111a-e.

In a second example, the user can override the broadband WAN service selection made using the configuration switch 615 via a graphical user interface (GUI) accessible via one of the USB connectors 610a-b, or one of the Ethernet connectors 112a-b. Further, the selection of the broadband WAN service can be accomplished via a remote configuration/management interface via one of the USB connector 610a-b or one the Ethernet connectors 112a-b. The use and implementation of a GUI for configuration of electronic devices and/or remote configuration/management interfaces are well known to persons of ordinary skill in the art, and, thus, will not be discussed further.

Figure 8:
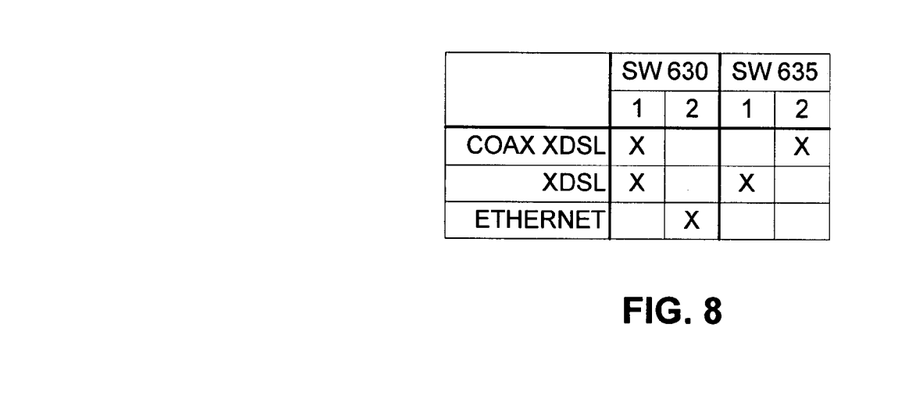
FIG. 8 is a table illustrating combinations of switch positions to enable each of the WAN services associated with the WAN interface connectors.

The switches 630, 635 are controlled by the switch controller 620 to select and enable the broadband WAN services selected by the user using the configuration switch 615 (or alternatively a GUI or remote configuration/management interface). The table of FIG. 8 illustrates combinations of switch 630, 635 positions corresponding to each of the broadband WAN services. For example, to enable xDSL on the connector 125, the switch controller 620 sets switch 635 to position 1 and switch 630 to position 1.

In a further example, instead of using a configuration switch 615, a GUI, or a remote configuration/management interface, selection of a broadband WAN service is implemented automatically by the FRG 600. To allow the FRG 600 to automatically select a broadband WAN service, the FRG 600 further includes an Ethernet sensor (not shown) and one or more xDSL sensors (not shown). The Ethernet sensor is capable of detecting the presence of Ethernet signals on the computer cable 410a, and is implemented as part of the Ethernet transceiver 405a, or, alternatively, is implemented separately from the Ethernet transceiver 405a. Example methods to detect Ethernet signals may use one of a variety of techniques well known to those of ordinary skill in the art. For example, the Ethernet sensor can use a filter to select a frequency signal band of interest, a signal strength meter to measure the signal strength in the frequency signal band of interest, and a comparator to compare the signals strength in the frequency signal band of interest, wherein the band of interest and the threshold are chosen so that reliable detection of Ethernet signals occurs.

To detect the presence of xDSL signals on the telephone line 110 or the coaxial cable 410b, the xDSL sensor may use one of a variety of techniques well known to those of ordinary skill in the art. For example, the xDSL sensor can use a filter to select a frequency signal band of interest, a signal strength meter to measure the signal strength in the frequency signal band of interest, and a comparator to compare the signal strength in the frequency signal band of interest to a programmable threshold, wherein the band of interest and the threshold are chosen so that reliable detect of xDSL signals occurs. To support a variety of xDSL signals (e.g., ADSL, VDSL, etc.) the xDSL sensor could be extended in any well known manner, for example, to measure signal strength in multiple bands of interest, to measure signal strength in multiple bands of interest and only require sufficient signal strength in one or more of the bands of interest. The xDSL sensor is implemented by the xDSL processor 115, or, alternatively, is implemented separately from the xDSL processor 115.

In the further example, where automatic selection of a broadband WAN service is implemented, the switch controller 620 uses outputs of the Ethernet sensor and the xDSL sensor to determine which broadband WAN service to select and enable. For example, the switch controller 620 repeatedly sets switch 635 to position 1 and records a first output of the xDSL sensor, sets switch 635 to position 2 and records a second output of the xDSL sensor, and then records an output of the Ethernet sensor until one of the sensor outputs indicates that a corresponding signal is present on one of the computer cable 410a, the coaxial cable 410b, or the telephone line 110. Having thus selected a broadband WAN service, the switch controller 620 sets the position of switches 630, 635 as discussed above in conjunction with FIG. 8. Further, the switch controller 620 may continue monitoring the Ethernet or xDSL sensor output corresponding to the selected broadband WAN service to verify that the selected broadband WAN service remains present. If the selected broadband WAN service is no longer present, the switch controller 620 may wait a period of time to determine if a temporary service interruption has occurred before repeating the above automatic selection process. In this way, the FRG 600 may both automatically select and re-select a broadband WAN service.

The switches 640a-d are controlled by the switch controller 620 to enable or disable HomePNA signals associated with one or more of the telephone lines 111a-e, 320. In the illustrated example of FIG. 6, the switch controller 620 may selectively disable HomePNA signals for individual telephone lines 111a-e, 320. Alternatively, the switches 640a-d are not implemented and the switch controller 620 enables/disables the HomePNA processor 305; or a single switch is used to disable HomePNA signals for all telephone lines 111a-e, 320.

The FRG 600 further includes a plurality of VoIP couplers 650a-f, wherein a VoIP coupler 650a-f is associated with each of the telephone lines 110, 111a-e. As described in detail below in conjunction with FIG. 9, the VoIP coupler 650a-f includes, among other things, a battery switch (controlled by the switch controller 620) to disconnect battery feed voltage and ring voltages, a VDSL sensor, and a POTS sensor.

Figure 9:
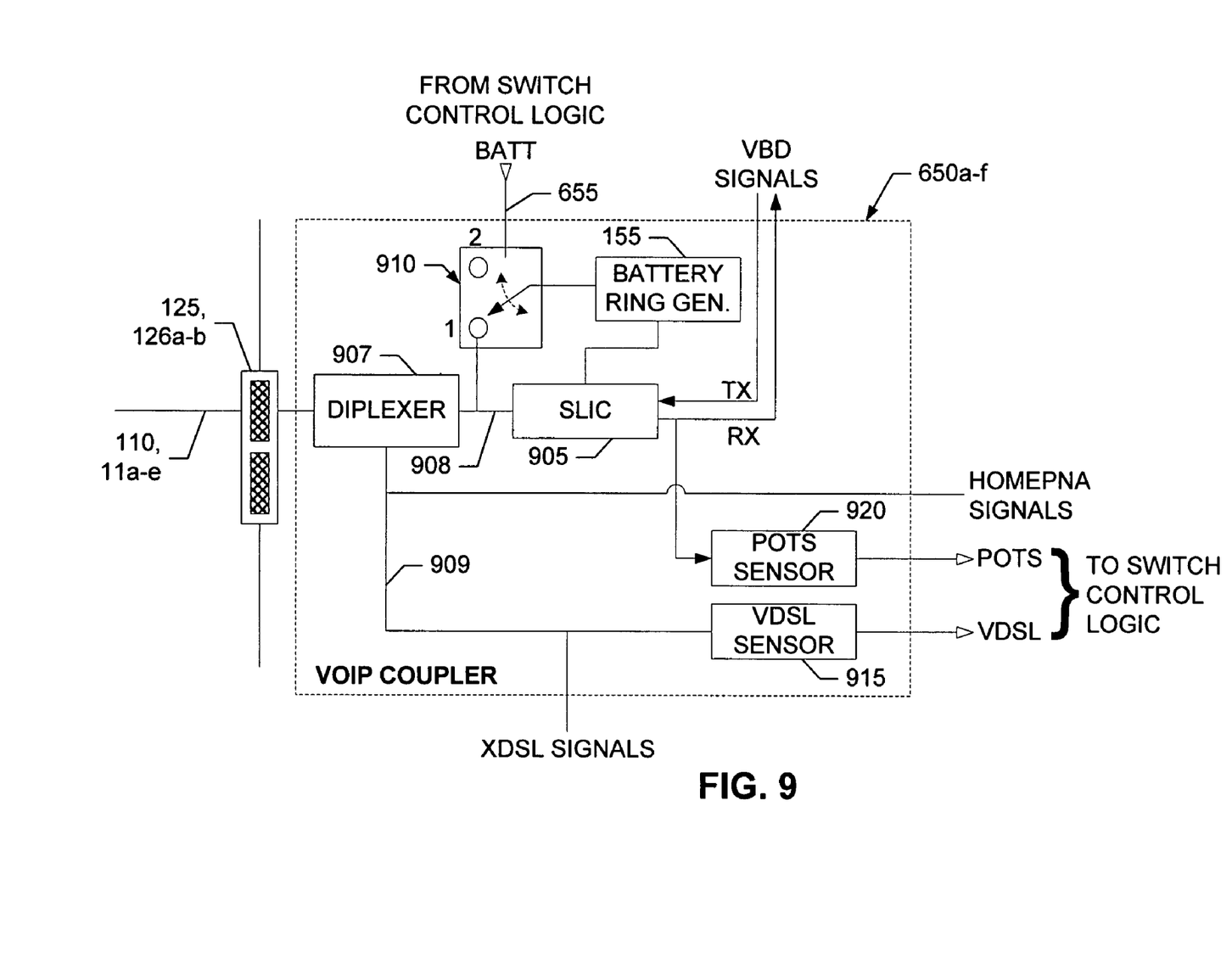
FIG. 9 is a block diagram illustration of a disclosed example manner of implementing the VoIP coupler of FIG. 6.

FIG. 9 shows a block diagram of an example manner of implementing the VoIP couplers 650a-f of FIG. 6. To properly couple and separate VBD signals, HomePNA signals and xDSL signals, the VoIP coupler 650a-f includes the subscriber line interface circuit (SLIC) 147, the battery/ring generator 155, a battery switch 910, and a diplexer 907. The battery switch 910 is controlled by one of a plurality of battery control signals 655, wherein each of the battery control signals 655 is associated the battery switch 910 for one of the VoIP couplers 650a-f. The connection of the battery control signals 655 between the switch controller 620 and the VoIP couplers 650a-f are not shown in FIG. 6, but persons of ordinary skill in the art will readily understand how these connections are implemented, and how the battery control signals 655 may be used to control the battery switches.

The SLIC 147 implements a 4-wire to 2-wire hybrid function between 4-wire VBD signals and 2-wire signals required for the telephone line 110,111a-e. Alternatively, the VBD signals may be routed within the FRG 600 as 2-wire signals and a 4-wire to 2-wire hybrid implemented in each of the VoIP processors 145a-b.

The 2-wire signals are coupled to the telephone line 110, 111a-e via the diplexer 907. The diplexer 907 consists of a low pass filter (not shown) and a high pass filter (not shown) operating in parallel, thereby allowing the diplexer to separate signals present on the telephone line 110, 111a-e into a first signal 908 containing the low frequency portions and a second signal 909 containing the high frequency portions of the signals present on the telephone line 110, 111a-e. Simultaneously, the diplexer 907 combines high and low frequency signals 908, 909 into a combined signal suitable for the telephone line 110, 111a-e. The battery switch 910 allows the VoIP coupler 650a-f to selectively provide or disable battery feed voltage and ring voltages. The battery switch 910 is controlled by the switch controller 620 via one of the plurality of battery control signals 655.

To detect the presence of VDSL signals the VoIP coupler 650a-f includes a VDSL sensor 915. Similarly, to detect the presence of battery feed voltage or sealing current provided by the PSTN 120, the VoIP coupler 650a-f further includes a POTS sensor 920. To detect the presence of VDSL signals, the VDSL sensor 915 may use one of a variety of techniques well known to those of ordinary skill in the art. For example, the VDSL sensor 915 can use a filter to select a frequency signal band of interest, a signal strength meter to measure the signal strength in the frequency signal band of interest, and a comparator to compare the signal strength in the frequency signal band of interest to a programmable threshold, wherein the band of interest and the threshold are chosen so that reliable detection of VDSL signals occurs. The VDSL sensor 915 could be extended in any well known manner, for example, to measure signal strength in multiple bands of interest, to measure signal strength in multiple bands of interest and only require sufficient signal strength in one or more of the bands of interest.

Likewise, to detect the presence of battery feed voltage or sealing current, the POTS sensor 920 may use one of a variety of techniques well known to those of ordinary skill in the art. For example, the POTS sensor 920 may use a low-pass filter to substantially eliminate AC voltages, a strength meter to measure the resulting DC voltage, and a comparator to compare the DC voltage to a plurality of thresholds. The thresholds could be used to determine if the DC voltage is near 0V, −48V, or −96V. As discussed earlier, if the battery switch 910 is set to enable the battery/ring generator 155 output signals onto the telephone line 110, 111a-e and the PSTN 120 is not providing battery feed voltage on the same telephone line, then the measured DC voltage should be approximately −48V. If the POTS sensor measures approximately 0V or −96V, then the switch controller 620 knows that the PSTN 120 is providing battery feed voltage and/or sealing current and the battery switch 910 must be set to disconnect the battery/ring generator 155 output signal from the telephone line 110, 111a-e.

Sealing current may not be continuously provided by the PSTN 120, and, therefore, the POTS sensor 920 must be capable to detect the presence of sealing current that is only present a portion of the time. Further, the switch controller 620 must be capable of recognizing the periodic or aperiodic detection of sealing current on a telephone line 110, 111a-e (as detected by the POTS sensor 920) and set the battery switch 910 to disconnect the battery/ring generator 155 output signal from the telephone line 110, 111a-e. For example, the POTS sensor 920 implements a "sticky" POTS sensor output 660 that continues indicating POTS present if POTS has been detected at one or more times until the switch controller resets the POTS sensor output 660.

The VDSL sensors 915 and the POTS sensors 920 of the VoIP couplers 650a-f provide a plurality of VDSL sensor outputs 665 and a plurality of POTS sensor outputs 660 used by the switch controller 620 of FIG. 6 to control the switches 640a-d of FIG. 6 and the battery switches 910. There is one VDSL sensor output 665 and one POTS sensor output 660 associated with each of the VoIP couplers 650a-f. The connection of the VDSL sensor outputs 665 and the POTS sensor outputs 660 between the VoIP couplers 650a-f and the switch controller 620 are not shown in FIG. 6, but persons of ordinary skill in the art will readily understand how these connections are implemented.

It should be readily appreciated by those of ordinary skill in the art that a suitable 4-wire to 2-wire hybrid functionality is required in appropriate locations for the HomePNA and the xDSL signals. However, for clarity, they are not shown in FIGS. 6 and 9. These hybrids can be implemented in a variety of well known locations in the FRG 600 using any number of well known prior art techniques. For example, implement a suitable xDSL hybrid in each VoIP coupler 650a-f associated with each VDSL sensor 915 and implement an additional suitable XDSL hybrid in the xDSL processor 115; implement a suitable HomePNA hybrid in each VoIP coupler 650a-f associated with the HomePNA signals or a implement a single suitable HomePNA hybrid in the HomePNA processor 305; implement a hybrid suitable for both HomePNA signals and xDSL signals in each VoIP coupler 650a-f; etc. Depending upon where hybrids are implemented, the HomePNA and xDSL signals will be routed within the FRG 600 as either 2-wire or 4-wire signals.

In the illustrated example of FIG. 6, only VoIP coupler 650a implements the VDSL sensor 915 and the switch controller 620 uses only a single VDSL sensor output 665 to determine if VDSL signals that interfere with HomePNA signals are present. It should be readily appreciated by those of ordinary skill in the art that alternatively each of the VoIP couplers 650a-f could implement a VDSL sensor 915; no VoIP coupler 650a-f implements a VDSL sensor 915 and the switch controller 620 uses a detection signal provided by the xDSL processor 115 to determine if VDSL signals are present; a single VDSL sensor 915 is implemented in one VoIP coupler 650a-f (or elsewhere in the FRG 600) that may be selectively configured by the switch controller 620 to receive the high frequency signal 909 from one of the VoIP couplers 650a-f at a time; etc. Further, the xDSL sensor (discussed above in connection with automatic selection of a broadband WAN service) and the VDSL sensor 915 may both be implemented by the XDSL processor 115.

Figure 10:
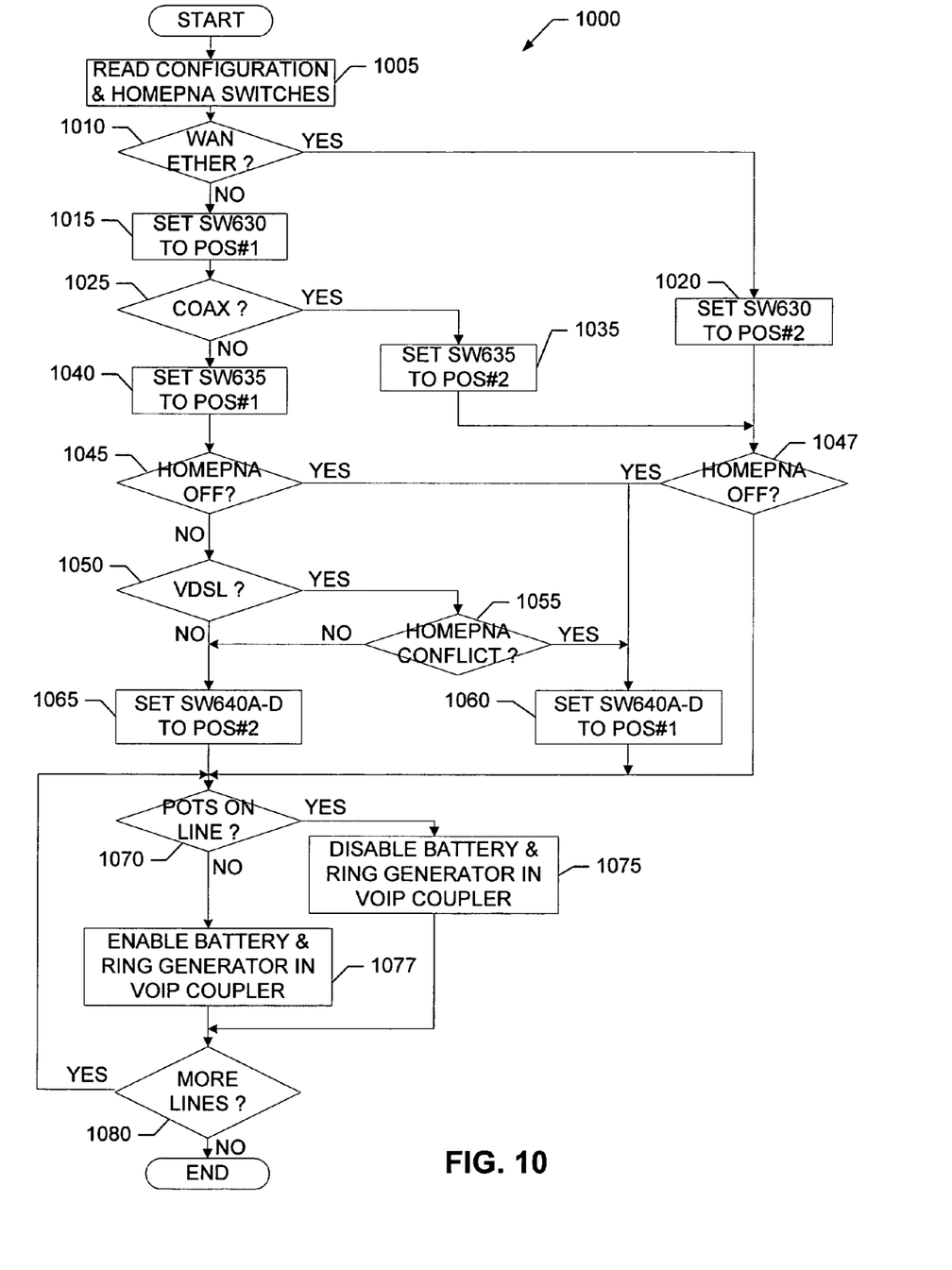
FIG. 10 is a flow chart illustrating a disclosed example process for implementing the switch control logic of FIG. 6.

FIG. 10 illustrates a flowchart representative of an example process 1000 that may be carried out by the FRG 600 of FIG. 6. In particular, the process 1000 may be implemented using the example switch controller 620 of FIG. 6. The process 1000 may be implemented using machine readable instructions that are executed by a processor, a controller, or any other suitable processing device. For example, the process 1000 may be embodied in coded instructions stored on a tangible medium such as a flash memory, or random-access memory (RAM) associated with a processor 1110 shown in an example processor platform 1100 discussed below in conjunction with FIG. 11. Alternatively, the process 1000 may be implemented using an application specific integrated circuit (ASIC), programmable logic device (PLD), field programmable logic device (FPLD), discrete logic, etc. Also, some portions of the process 1000 may be implemented manually or as combinations of any of the foregoing techniques. Further, although the example process 1000 is described with reference to the flowchart of FIG. 10, persons of ordinary skill in the art will readily appreciate that many other methods of implementing the example switch controller 620 of FIG. 6 may be used. For example, the order of execution of the blocks may be changed, and/or some of the blocks described may be changed, eliminated, or combined.

The process of FIG. 10 begins with the switch controller 620 reading the position of the configuration switch (block 1005). If the configuration switch 615 is in the WAN Ethernet position (block 1010), then the switch controller 620 sets switch 630 to position 2 (block 1020). Otherwise the switch controller 620 sets switch 630 to position 1 (block 1015). If the configuration switch 615 is in the coaxial cable position (block 1025), then the switch controller 620 sets switch 635 to position 2 (block 1035). Otherwise the switch controller 620 sets switch 635 to position 1 (block 1040).

The switch controller 620 reads the position of the HomePNA switch 625 (block 1045 or 1047). If HomePNA is disabled (as indicted by position of HomePNA switch 625) (block 1045), the switch controller 620 sets the switches 640a-d to position 1 to disable HomePNA signals for the telephone lines 111a-e (block 1060).

Next, the switch controller 620 reads the output of the VDSL sensor 915 associated with the VoIP coupler 650a (block 1050). If VDSL signals are not present (as indicated by the VDSL sensor output 655), then the switch controller sets switches 640a-d to position 2 to enable HomePNA signals for the telephone lines 111a-e (block 1065). Otherwise, the switch controller queries the HomePNA processor 305 for the version of HomePNA signals implemented by the HomePNA processor 305 (block 1055). If the HomePNA signals are being used that would interfere with VDSL signals (e.g., HomePNA version 2) the switch controller 620 sets the switches 640a-d to position 1 to disable HomePNA signals (block 1060). Otherwise, the switch controller 620 sets the switches 640a-d to position 2 to enable HomePNA signals (block 1065).

The switch controller then reads the POTS sensor 920 associated with a VoIP coupler 650a-f (block 1070). If the associated POTS sensor output 660 indicates that POTS signals (e.g., battery feed voltage or sealing current) are present, the switch controller 620 sets the battery switch 910 to position 2 to disable battery feed voltage for the telephone line corresponding to the VoIP coupler 650a-f (block 1075). Otherwise, the switch controller 620 sets the battery switch 910 to position 1 to enable battery feed voltage for the telephone line corresponding to the VoIP coupler 650a-f (block 1077). Next, the switch controller 620 determines if more telephone lines remain (block 1080). If more telephone lines remain, the process 1000 returns to block 1070 to process the next telephone line. Otherwise, switch controller 620 then stops executing the process 1000.

Alternatively, the switch controller 620 waits for a configurable amount of time to elapse, returns to block 1005, and repeats the configuration process. In this fashion, the FRG 600 can self reconfigure if signal conditions on one or more of the telephone lines 110a-e change or the user changes the configuration switch 615.

Figure 11:
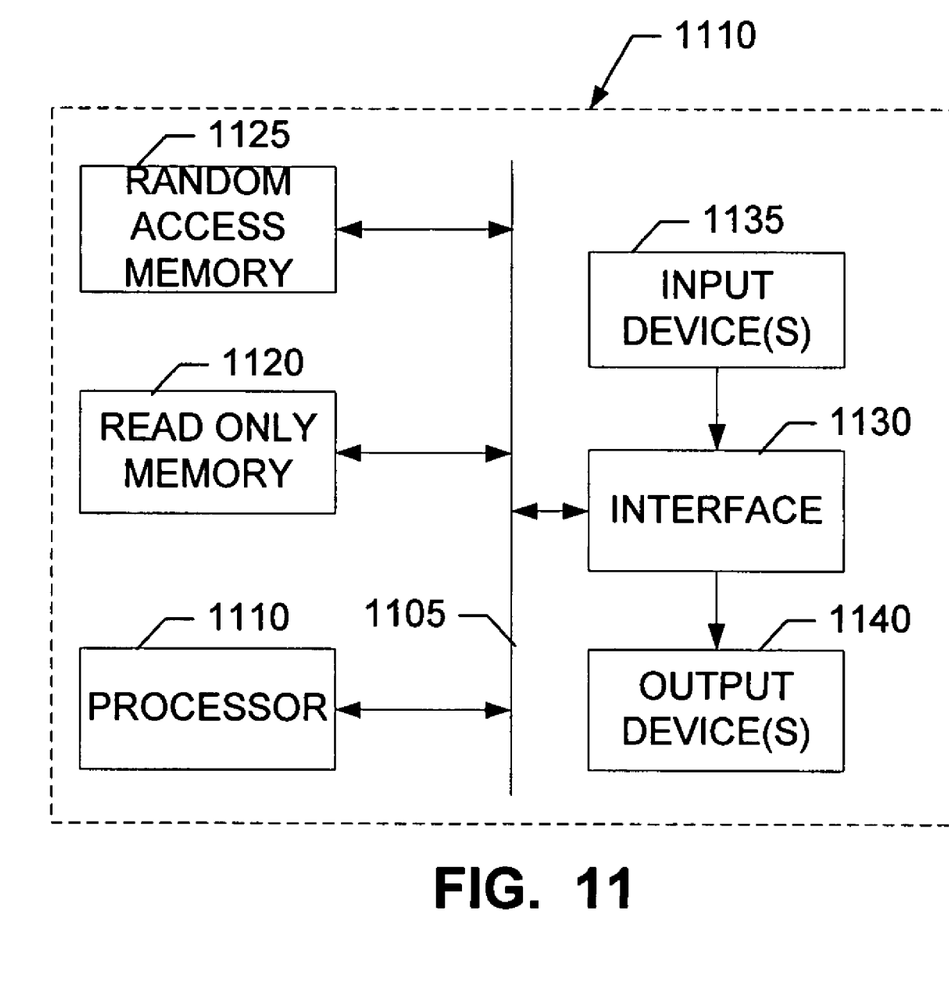
FIG. 11 is a block diagram illustration of an example processor platform that may execute the example process of FIG. 10 to implement the switch controller of FIG. 6.

FIG. 11 is a block diagram of an example processor platform 1100 capable of implementing the example process 1000 of FIG. 10. For example, the processor platform 1100 can be implemented by one or more general purpose microprocessors, microcontrollers, etc.

The processor platform 1100 of the instant example includes the processor 1110 that is a general purpose programmable processor. The processor 1110 executes coded instructions present in main memory of the processor 1110. The processor 1110 may implement, among other things, the switch controller 620.

The processor 1110 is in communication with the main memory including a read only memory (ROM) 1120 and a random access memory (RAM) 1125 via a bus 1105. The RAM 1125 may be implemented by Synchronous Dynamic Random Access Memory (SDRAM), Dynamic Random Access Memory (DRAM), and/or any other type of random access memory device. The ROM 1120 may be implemented by flash memory and/or any other desired type of memory device. Access to the memory space 1120, 1125 is typically controlled by a memory controller (not shown) in a conventional manner.

The processor platform 1100 also includes a conventional interface circuit 1130. The interface circuit 1130 may be implemented by any type of well known interface standard, such as an external memory interface, serial port, general purpose input/output, etc.

One or more input devices 1135 are connected to the interface circuit 1130. The input device(s) 1135 (e.g., VDSL sensors 915, POTS sensors 920.) may be used to provide the processor 1110 information on what signals are present on one or more of the telephone lines 110, 111a-e.

One or more output devices 1140 are also connected to the interface circuit 1130. The output devices 1140 (e.g., switches 630, 635, 640a-d,655) may be used by the processor 1110 to control which broadband WAN service is enabled, and whether battery feed voltage is provided on one or more of the telephone lines 110, 111a-e.

From the foregoing, persons of ordinary skill in the art will appreciate that the above disclosed methods and apparatus may be realized within a single device or across two cooperating devices, and could be implemented by software, hardware, and/or firmware to implement the improved wireless receiver disclosed herein.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A flexible residential gateway apparatus providing access to an external communications network, and providing communications with an in home network, the flexible residential gateway comprising:
    at least one voice over Internet protocol (IP) (VoIP) processor for providing at least one VoIP service to the in home network through at least one telephone line, and processing VoIP signals communicated with the in home network;
    at least one VoIP coupler connecting VoIP signals between at least one VoIP processor and at least one telephone line, wherein the VoIP coupler is to provide a battery feed voltage and ring voltages supporting telephone operation for at least one telephone line;
    an xDSL ("x" variety of Digital Subscriber Line) processor for providing access to the external communications network through one of the telephone lines, and processing xDSL signals communicated with the connected external communications network;
    a HomePNA (Home PhoneLine Networking Alliance) processor for providing HomePNA communications with the in home network through at least one telephone line, and processing HomePNA signals communicated with the connected in home network; and
    a switch controller to disconnect the battery feed voltage and the ring voltages from at least one telephone line if plain old telephone service (POTS) signals are detected on at least one telephone line, wherein the switch controller is further to disconnect the HomePNA processor from at least one telephone line if VDSL (Very high speed Digital Subscriber Line) signals that interfere with the HomePNA signals are present on at least one telephone line.

2. A flexible residential gateway apparatus as defined in claim 1 wherein the VoIP coupler comprises a configurable battery switch to disconnect the battery feed voltage and the ring voltages from at least one telephone line, and the switch controller disconnects the battery feed voltage and the ring voltages from at least one telephone line by configuring the configurable battery switch of at least one VoIP coupler.

3. A flexible residential gateway apparatus as defined in claim 2 further comprising at least one POTS sensor capable to detect the presence of POTS signals on at least one telephone line, and wherein the switch controller uses at least one POTS sensor output to determine whether to disconnect the battery feed voltage and the ring voltages from at least one telephone line.

4. A flexible residential gateway apparatus as defined in claim 3 wherein a respective VoIP coupler, a respective configurable battery switch, and a respective POTS sensor are associated with each telephone line.

5. A flexible residential gateway apparatus as defined in claim 4 wherein the switch controller controls the configurable battery switch of a first VoIP coupler associated with a first telephone line to disconnect the battery feed voltage and the ring voltages from the first telephone line if POTS signals are detected on the first telephone line.

6. A flexible residential gateway apparatus as defined in claim 3 wherein POTS signals comprise at least one of battery feed voltage or sealing current.

7. A flexible residential gateway apparatus as defined in claim 1 wherein the flexible residential gateway is expanded using at least one additional VoIP processor, at least one additional VoIP coupler, and at least one additional telephone line implemented in at least one expansion unit attached to the flexible residential gateway via at least one communications cable or connector.

8. A flexible residential gateway apparatus as defined in claim 1 further comprising:
   at least one configurable switch to disconnect the HomePNA processor from at least one telephone line; and
   one VDSL sensor to detect the presence of VDSL signals on a first telephone line that communicates xDSL signals with the connected external network;
   wherein the switch controller controls at least one configurable switch to disconnect the HomePNA processor from all telephone lines if VDSL signals that interfere with the HomePNA signals are present on the first telephone line that communicates xDSL signals with the connected external network.

9. A flexible residential gateway apparatus as defined in claim 1
   wherein a respective VoIP coupler and a respective POTS sensor are associated with each telephone line, and
   wherein the switch controller controls a first VoIP coupler associated with a first telephone line to disconnect the battery feed voltage and the ring voltages from the first telephone line if POTS signals are detected by the first POTS sensor on the first telephone line.

10. For a flexible residential gateway providing access to an external communications network, and providing voice over Internet protocol (IP) (VoIP) communications between at least one VoIP processor and an in home network through at least one telephone line, the flexible residential gateway providing a battery feed voltage and ring voltages to the at least one telephone line if a VoIP signal is present, a self-configuration method comprising:
    detecting the presence of plain old telephone service (POTS) signals on at least one telephone line;
    disconnecting the battery feed voltage and ring voltages from at least one telephone line if POTS signals are detected on at least one telephone line, the battery feed voltage and the ring voltages provided to support telephone operation;
    detecting the presence of VDSL (Very high speed Digital Subscriber Line) signals on at least one telephone line, and disconnecting a HomePNA processor from at least one telephone line if VDSL signals that interfere with HomePNA communications are detected on at least one telephone line.

11. A self-configuration method as defined in claim 10 wherein disconnecting a battery feed voltage and ring voltages from at least one telephone line uses at least one configurable battery switch.

12. A self-configuration method as defined in claim 10 wherein detecting the presence of POTS signals uses at least one POTS sensor to detect the presence of POTS signals on at least one telephone line.

13. A self-configuration method as defined in claim 12 wherein a respective POTS sensor is associated with each telephone line, and wherein the battery feed voltage and the ring voltages are disconnected from a first telephone line if POTS signals are detected on the first telephone line.

14. A self-configuration method as defined in claim 12 wherein POTS signals are comprised of at least one of battery feed voltage or sealing current.

15. A self-configuration method as defined in claim 10 further comprising detecting the presence of POTS signals on at least one additional telephone line associated with at least one expansion unit that is attached to the flexible residential gateway through at least one communications cable or connector, and disconnecting a battery feed voltage and ring voltages associated with an expansion unit from at least one additional telephone line associated with the expansion unit if POTS signals are detected on at least one of the additional telephone lines.

16. A self-configuration method as defined in claim 10 further comprising detecting the presence of VDSL signals on one telephone line, and disconnecting the HomePNA processor from all telephone lines if VDSL signals that interfere with HomePNA communications are detected on the one telephone line.

17. A self-configuration method as defined in claim 10 further comprising detecting the presence POTS signals on each telephone line, and disconnecting the battery feed voltage and the ring voltages from a first telephone line if POTS signals are detected on the first telephone line.

18. An article of manufacture storing machine readable instructions which, when executed, cause a machine to:
    provide access to an external communications network, and provide voice over Internet protocol (IP) (VoIP) communications between at least one VoIP processor and an in home network through at least one telephone line;
    provide a battery feed voltage and ring voltages to the at least one telephone line if a VoIP signal is present;
    detect the presence of plain old telephone service (POTS) signals on at least one telephone line;
    disconnect the battery feed voltage and ring voltages from at least one telephone line if POTS signals are detected on at least one telephone line, the battery feed voltage and the ring voltages provided to support telephone operation;
    detect the presence of VDSL (Very high speed Digital Subscriber Line) signals on at least one telephone line, and
    disconnect a HomePNA processor from at least one telephone line if VDSL signals lines that interfere with HomePNA communications are detected on at least one telephone line.

19. An article of manufacture as defined in claim 18 wherein the machine readable instructions cause the machine to disconnect a battery feed voltage and ring voltages from at least one telephone line by using at least one configurable battery switch.

20. An article of manufacture as defined in claim 18 wherein the machine readable instructions cause the machine to detect POTS signals by using the at least one POTS sensor to detect the presence of POTS signals on at least one telephone line.

21. An article of manufacture as defined in claim 20 wherein the machine readable instructions cause the machine to detect POTS signals for each telephone line, and to disconnect the battery feed voltage and the ring voltages from a first telephone line if POTS signals are detected on the first telephone line.

22. An article of manufacture as defined in claim 20 wherein the machine readable instructions cause the machine to detect POTS signals comprised of at least one of battery feed voltage or sealing current.

23. An article of manufacture as defined in claim 18 wherein the machine readable instructions cause the machine to detect the presence of POTS signals on at least one additional telephone line associated with at least one expansion unit attached to the flexible residential gateway through at least one communications cable or connector, and disconnect a battery feed voltage and ring voltages associated with an expansion unit from at least one additional telephone line associated with expansion unit if POTS signals are detected on at least one of the additional telephone lines.

* * * * *